A. KESSBERGER.
Wagon Brake.
No. 88,721. Patented April 6, 1869.
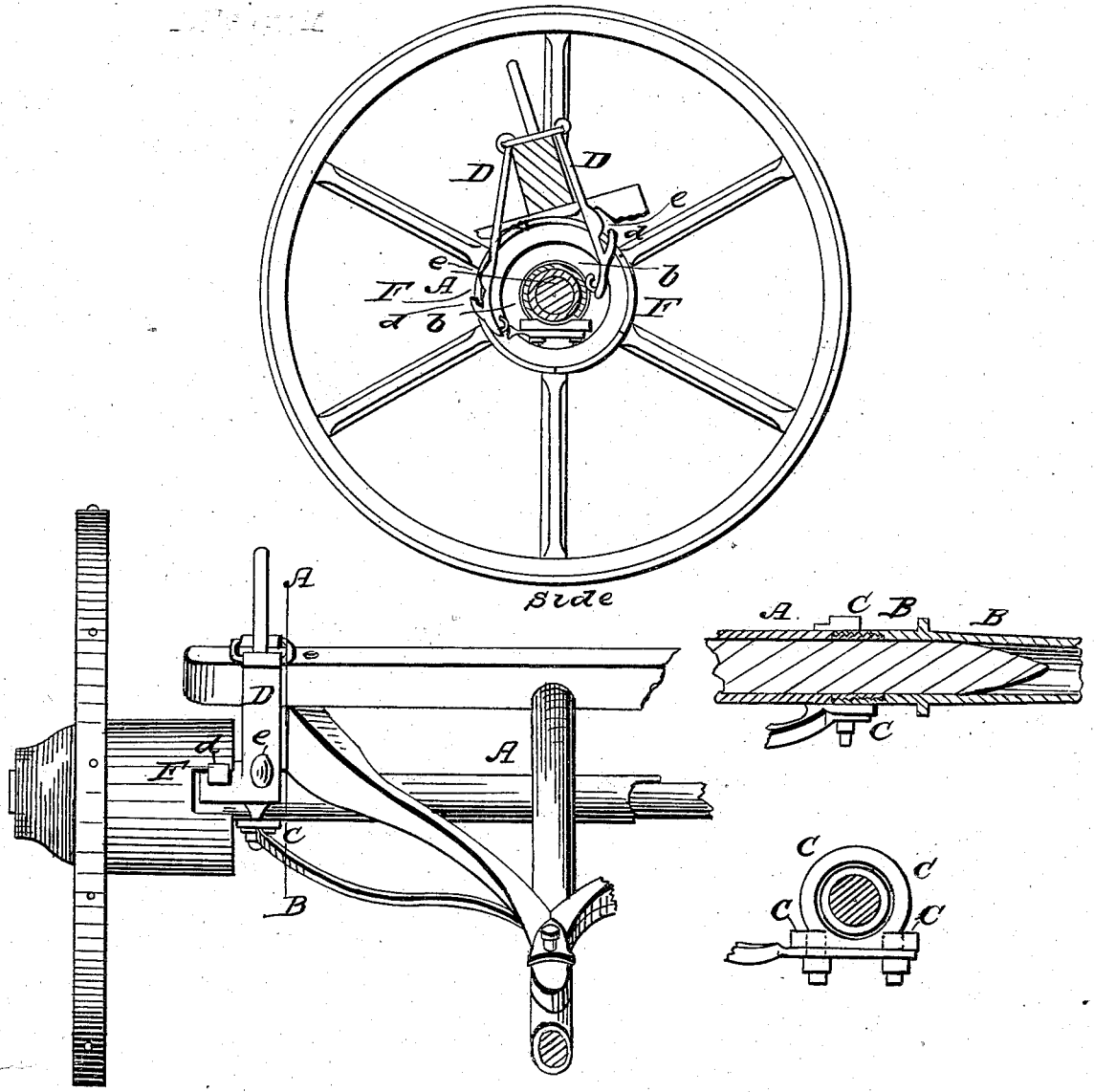

AUGUST KESSBERGER, OF SPRINGFIELD, ILLINOIS.

Letters Patent No. 88,721, dated April 6, 1869.

IMPROVEMENT IN WAGON-BRAKE

The Schedule referred to in these Letters Patent and making part of the same.

Be it known that I, AUGUST KESSBERGER, of the city of Springfield, county of Sangamon, and State of Illinois, have invented a new and useful Improvement in the Method of Constructing Axle-Trees, Coupling-Bars, &c., to Wagons, and a Self-Acting Brake to be Attached to the Same; and I do hereby declare that the following is a full, clear, and exact description of the same, reference being had to the accompanying drawings, and to the letters of reference marked thereon.

My invention consists in the peculiar construction and arrangement of a brake, by means of which it is self-operating, effective, and cheap, and applicable to any wagon.

The axle and coupling-bar show the construction of the same.

A is an axle-tree, of hollow pipe, filled in with wood.

B is the thimble-skein, a sectional view of which is given in the drawing, showing the wood filling, and so constructed as to screw on over the end of the axle-tree, and in under the clip C, which helps to hold it firmly in place, and keeps the thimble-skein from bursting or splitting open.

This thimble-skein is also hollow for about half its length, from where it fits on to the axle, and the wood filling from the axle extends into this thimble-skein.

D is the self-acting brake, consisting of a broad piece of metal, slightly convex, with the convex side farthest from the axle, and swinging loosely from hinges on the top of the bolster above the axle, and so near the but of the hub that they may swing under the slotted flanges F, which extend inward from the hub over the axle.

When the bolster is tipped forward or backward by the declination of the wagon, these brakes swing forward, and catch, by means of the projecting pin $d$, in one of the slots of the flange, and stop the revolution of the wheel.

A heavy piece of metal, $e$, is attached to outside of the brake, near the bottom, which assists the vibration, or action of the brake.

On the inside of these brakes, are two small hooks, $ff$, through which and around the axle, a cord runs to the driver, and by which the brakes are kept up close to the axle, when not in use.

This arrangement prevents the brakes swinging forward and backward, and blocking the wheels, when going over uneven ground.

Now, what I claim as my invention, and desire to secure by Letters Patent, is—

1. The self-acting brake D, constructed and arranged substantially as herein described, and for the purposes set forth.

2. The combination of the self-acting brake D, pin $d$, and slotted flanges F, substantially as herein described, and for the purposes set forth.

AUGUST KESSBERGER.

Witnesses:
JAMES G. HILL,
GEO. O. MARCY.